United States Patent
Yamazaki et al.

(10) Patent No.: US 7,220,939 B2
(45) Date of Patent: May 22, 2007

(54) LASER BEAM MACHINE

(75) Inventors: Tsunehiko Yamazaki, Aichi-ken (JP); Naoomi Miyagawa, Gifu-ken (JP)

(73) Assignee: Yamazaki Mazak Kabushiki Kaisha (JP)

( * ) Notice: Subject to any disclaimer, the term of this patent is extended or adjusted under 35 U.S.C. 154(b) by 0 days.

(21) Appl. No.: 11/054,628

(22) Filed: Feb. 9, 2005

(65) Prior Publication Data
US 2005/0178753 A1 Aug. 18, 2005

(30) Foreign Application Priority Data
Feb. 18, 2004 (JP) ............................. 2004-041240

(51) Int. Cl.
*B23K 26/02* (2006.01)
*B23K 26/08* (2006.01)

(52) U.S. Cl. ............................. 219/121.74; 219/121.78

(58) Field of Classification Search ........... 219/121.74, 219/121.78, 121.82; 74/37
See application file for complete search history.

(56) References Cited

U.S. PATENT DOCUMENTS

| | | | |
|---|---|---|---|
| 4,704,913 A | | 11/1987 | Zimmer |
| 4,967,053 A | * | 10/1990 | Aharon ................ 219/121.78 |
| 4,972,062 A | * | 11/1990 | Aharon ................ 219/121.78 |
| 5,051,558 A | | 9/1991 | Sukhman |
| 5,304,773 A | * | 4/1994 | Kilian et al. ............ 219/121.78 |
| 5,560,843 A | * | 10/1996 | Koike et al. ............ 219/121.48 |
| 6,294,755 B1 | * | 9/2001 | Sawatzky et al. ...... 219/121.72 |
| 6,310,317 B1 | | 10/2001 | Remue |
| 2003/0034336 A1 | | 2/2003 | Erlenmaier et al. |

FOREIGN PATENT DOCUMENTS

| | | | |
|---|---|---|---|
| JP | 60199586 A | | 9/1985 |
| JP | 04371382 A | | 12/1992 |
| JP | H05-154681 A | | 6/1993 |
| JP | 406198480 A | * | 7/1994 |
| JP | 11285886 A | | 10/1999 |

OTHER PUBLICATIONS

EP Int'l. Search Report, May 30, 2005.

* cited by examiner

*Primary Examiner*—Samuel M. Heinrich
(74) *Attorney, Agent, or Firm*—Robert F. Zielinski; Wolf Block Schorr and Solis-Cohen LLP

(57) ABSTRACT

A laser beam machine can make quality of machining almost constant in such a manner that a first reflecting means in a first beam guide portion is moved and driven so as to maintain a length of an optical path of laser beam to be almost constant in spite of a moved position of a machining head. According to the invention, a second reflecting means for catching laser beam in a second beam guide portion is located at a position facing the first reflecting means, thereby relatively shortening a length of the optical path between the first and second reflecting means and shortening the whole length of the optical path, and maintaining quality of machining with laser beam good.

8 Claims, 8 Drawing Sheets

LASER BEAM MACHINE

BACKGROUND OF THE INVENTION

The invention relates to a laser beam machine wherein a length of an optical path of laser beam is almost constant in spite of a moved position of a machining head.

In a laser beam machine, a workpiece is machined while a machining head being moved. If a length of an optical path of laser beam changes together with a movement of a machining head, degree of collecting laser beam changes, so that it is difficult to maintain a quality of machining to be constant. Due to this reason, various kinds of laser beam machines having almost constant length of the optical path of laser beam in spite of a moved position of a machining head have been proposed (see Japanese patent applications, Publication numbers 2002-336979 and 1996(H8)-52587).

FIG. 8 is a typical view showing a structure of a conventional laser beam machine. A reference number 200 of FIG. 8 is a laser beam oscillator for generating laser beam, and a reference number 201 is a machining head for radiating laser beam on a workpiece, while being moved and driven. A reference number 202 is a machining table for locating a workpiece thereon, and reference numbers 203, 204 are beam guide portions for guiding laser beam from the laser beam oscillator 200 to the machining head 201. At a position near the laser beam oscillator 200, a reflecting mirror 205a is located, at an end portion of the beam guide portion 203, reflecting mirrors 205b, 205e are located, in an inside of the beam guide portion 203, reflecting mirrors 205c, 205d are located so as to face both reflecting mirrors 205b, 205e, at a position facing the reflecting mirror 205e, a reflecting mirror 205f is located, and at a position facing the reflecting mirror 205f, a reflecting mirror 205g is located on the side of the beam guide portion 204. With this structure, laser beam L generated by the laser beam oscillator 200 is reflected by the reflecting mirrors 205a, 205b, 205c, 205d, 205e, 205f, and 205g in this order so as to reach the machining head 201. The reflecting mirrors 205c, 205d are supported by a block 206 for adjusting a length of an optical path, and are moved according to quantity of movement of the machining head 201, so that the length of the optical path from the laser beam oscillator 200 to the machining head 201 is maintained to be almost constant.

Although quality of machining can be maintained to be constant if the length of the optical path from the laser beam oscillator 200 to the machining head 201 can be made almost constant, the shorter the length of the optical path is, the better the quality of machining is. That is, the shorter and almost constant length of the optical path is, good.

In such a laser beam machine, at least two reflecting mirrors 205e, 205f are located between "the reflecting mirror 205d for adjusting a length of an optical path" and "the reflecting mirror 205g on the beam guide portion 204 side", and laser beam reaches the beam guide portion 204 after taking a long path as shown with an arrow A. Then, the length of the optical path of laser beam becomes longer due to taking a long way, so that a quality of machining decreases.

Besides, it is necessary to seal the beam guide portions 203, 204 so as not to enter dusts and the like therein. When using bellows for sealing, the bellows is easy to be damaged due to repetitive driving, and the durability is low.

Then, a laser beam machine for preventing deterioration of quality of machining by making a length of an optical path of laser beam short and almost constant is still desired. Besides, a laser beam machine having superior durability is still desired.

SUMMARY OF THE INVENTION

One aspect of the invention is a laser beam machine having laser beam generating means for generating laser beam, a first beam guide portion for guiding said laser beam from said laser beam generating means in a first direction, a second beam guide portion for guiding said laser beam from said first beam guide portion in a second direction, and a machining head for radiating said laser beam passed through said first beam guide portion and said second beam guide portion, being moved and driven, on a workpiece, said machining head located adjacent to said second beam guide portion, comprising:

a movable first reflecting means located at said first beam guide portion, for adjusting a length of an optical path of said laser beam according to a change of a reflected position of said laser beam; and a second reflecting means supported by said second beam guide portion so as to face said first reflecting means, for introducing said laser beam reflected by said first reflecting means into said second beam guide portion.

According to this aspect of the invention, the first reflecting means for adjusting the length of the optical path of laser beam and the second reflecting means for introducing laser beam into the second beam guide portion are located at positions facing each other, so that the length of the optical path of laser beam after reflecting by the first reflecting means until introducing in the second beam guide portion can be made relatively shorter, and quality of machining with laser beam can be made good.

Another aspect of the invention is the laser beam machine, wherein said second beam guide portion is moved and driven in said first direction in such a state that at least a part thereof is adjacent to said first beam guide portion, and said second reflecting means is supported by a portion adjacent to said first beam guide portion on said second beam guide portion side and is moved and driven together with said second beam guide portion.

According to this aspect of the invention, the second reflecting means is moved and driven together with the second beam guide portion, so that means for driving and moving the second reflecting means is unnecessary, and the structure can be simplified in comparison with a case where the second reflecting means is not moved and driven together with the second beam guide portion. Besides, the second reflecting means is moved and driven together with the second beam guide portion, so that the relative positional relation between both is always properly maintained, and laser beam can be correctly guided from the second reflecting means to the machining head.

Another aspect of the invention is the laser beam machine, wherein a first opening portion is formed at said first beam guide portion on a side adjacent to said second beam guide portion along said first direction, a first belt member is located along said first opening portion, and said first belt member is located so as to close said first opening portion in a portion excluding a portion adjacent to said second beam guide portion and so as not to close said first opening portion in said portion adjacent to said second beam guide portion in order to allow said laser beam to be entered into said second beam guide portion.

According to this aspect of the invention, the first opening portion is only closed by the first belt member, so that it is sufficient to locate the first belt member at the position spaced from the first opening portion in order to partially open the first opening portion. Therefore, the first belt member is hard to be damaged if closing and opening of the opening portion is repeated, and its durability is improved in comparison with a conventional case using bellows.

Another aspect of the invention is the laser beam machine; wherein said machining head is moved and driven in said second direction, adjacent to said second beam guide portion, and a third reflecting means which moves together with said machining head introduces said laser beam from said second beam guide portion into said machining head.

According to this aspect of the invention, the third reflecting means is moved together with the machining head, so that means for driving and moving the third reflecting means is unnecessary, and the structure can be simplified in comparison with the case where the third reflecting means is not moved together with the machining head. Besides, the third reflecting means is moved together with the machining head, so that the relative positional relation between both is always properly maintained, and laser beam can be correctly guided from the third reflecting means to the machining head.

Another aspect of the invention is the laser beam machine, wherein a second opening portion is formed at said second beam guide portion along said second direction, a second belt member is located along said second opening portion, and said second belt member is located so as to close said second opening portion in a portion excluding a portion adjacent to said machining head and so as not to close said second opening portion in said portion adjacent to said machining head in order to allow said laser beam to be entered into said machining head.

According to this aspect of the invention, the second opening portion is only closed by the second belt member, so that it is sufficient to locate the second belt member at the position spaced from the second opening portion in order to partially open the second opening portion. Therefore, the second belt member is hard to be damaged if opening and closing of the opening portion is repeated, and its durability is improved in comparison with a conventional case using bellows.

DESCRIPTION OF THE PREFERRED EMBODIMENTS

Best mode of an embodiment of the invention is now explained, referring to the appended drawings.

Figure 1:
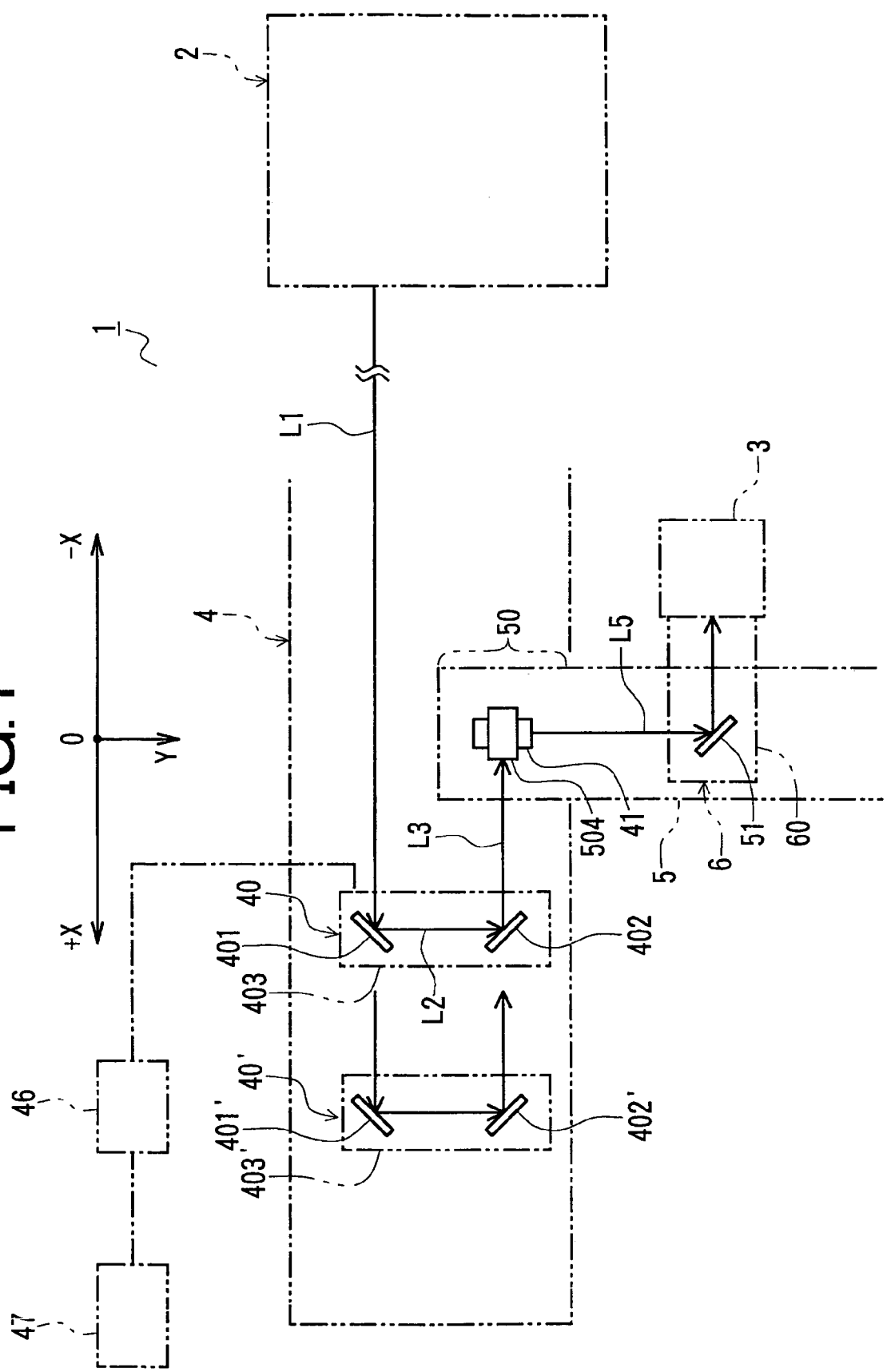
FIG. 1 is a typical view for explanation of a schematic structure of a laser beam machine according to the invention.
Figure 2:
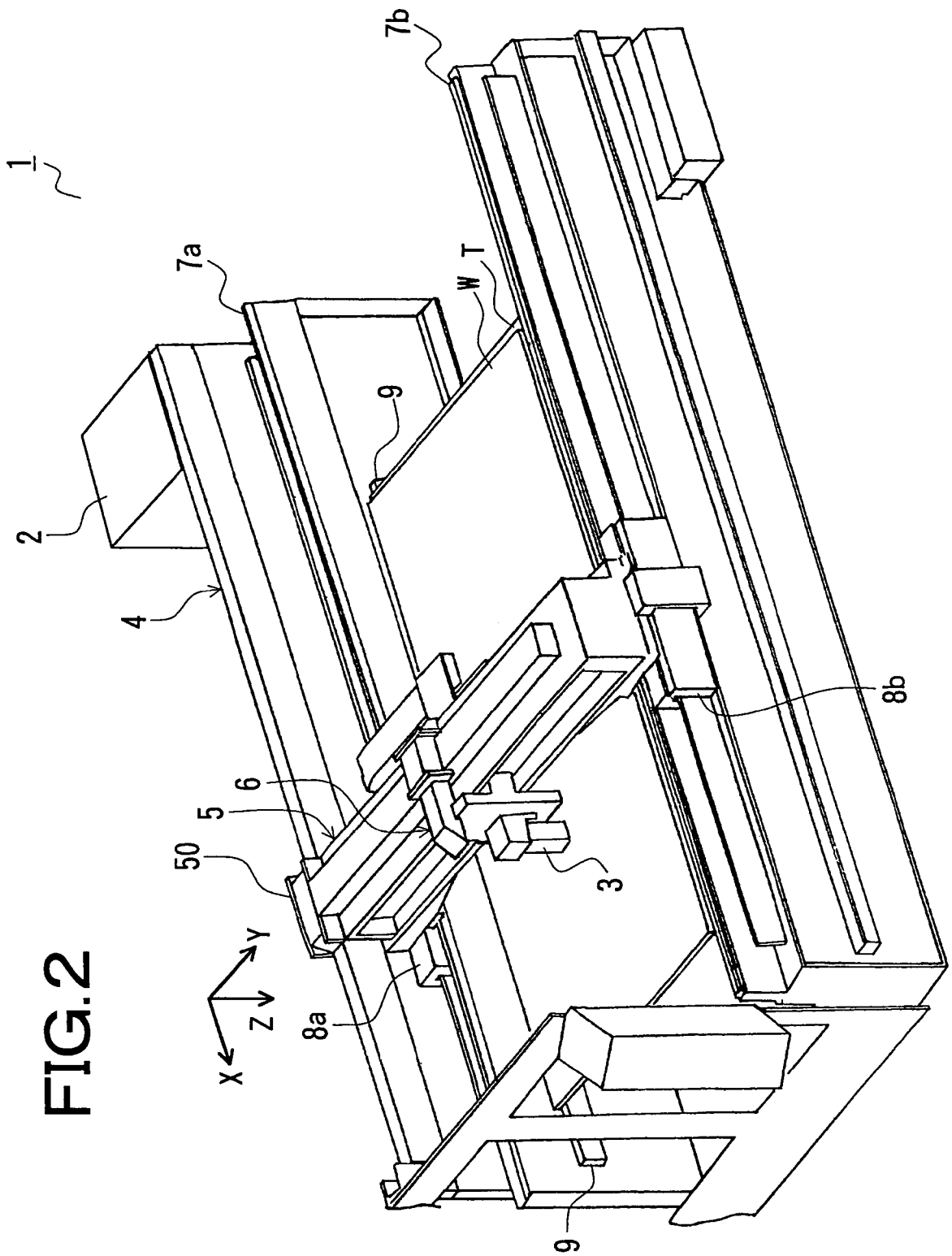
FIG. 2 is a perspective view of an appearance of the whole structure of the laser beam machine according to the invention.
Figure 3:
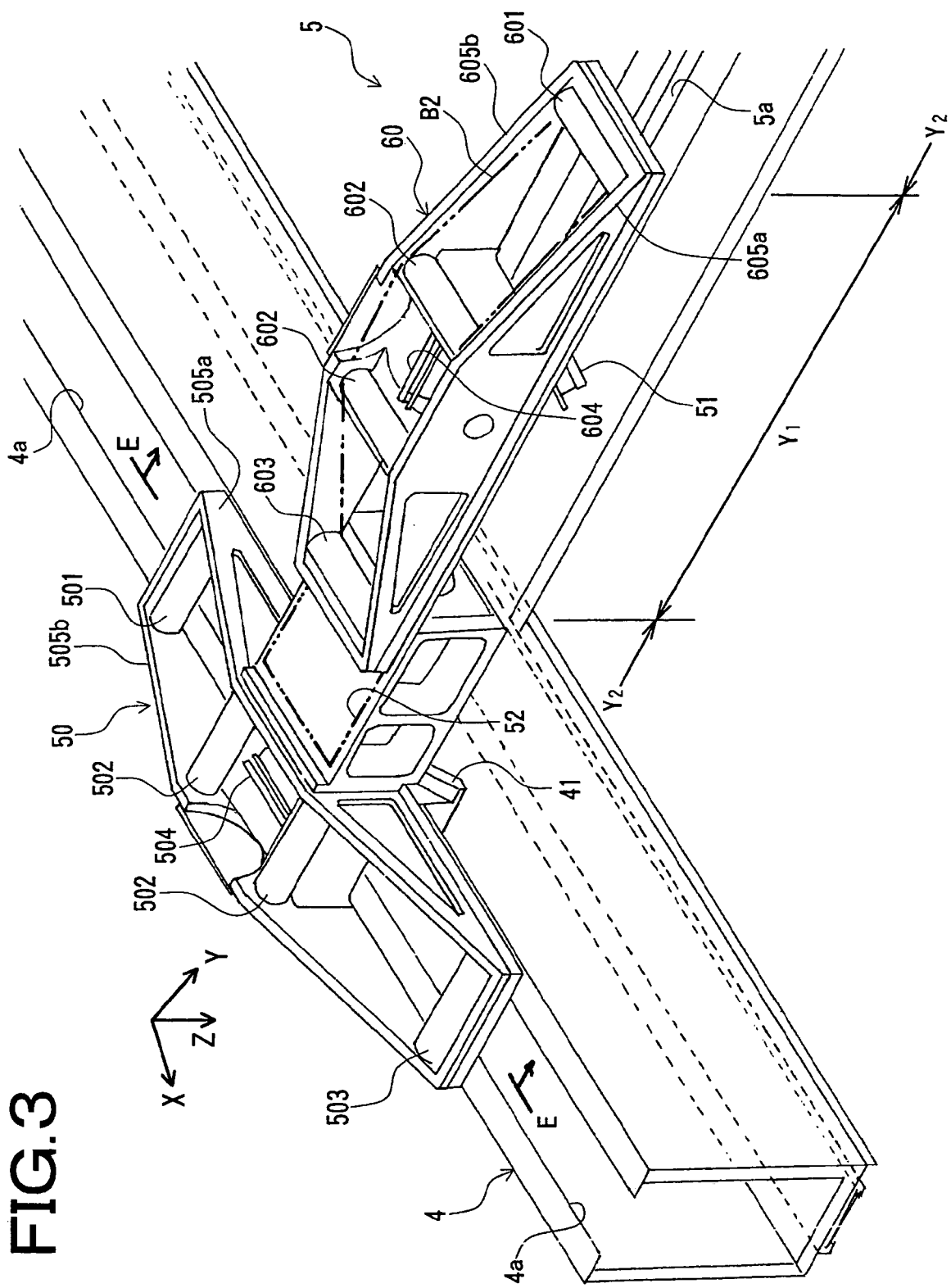
FIG. 3 is a perspective view showing a detailed structure of a portion for catching laser beam between a first beam guide portion and a second beam guide portion.
Figure 4:
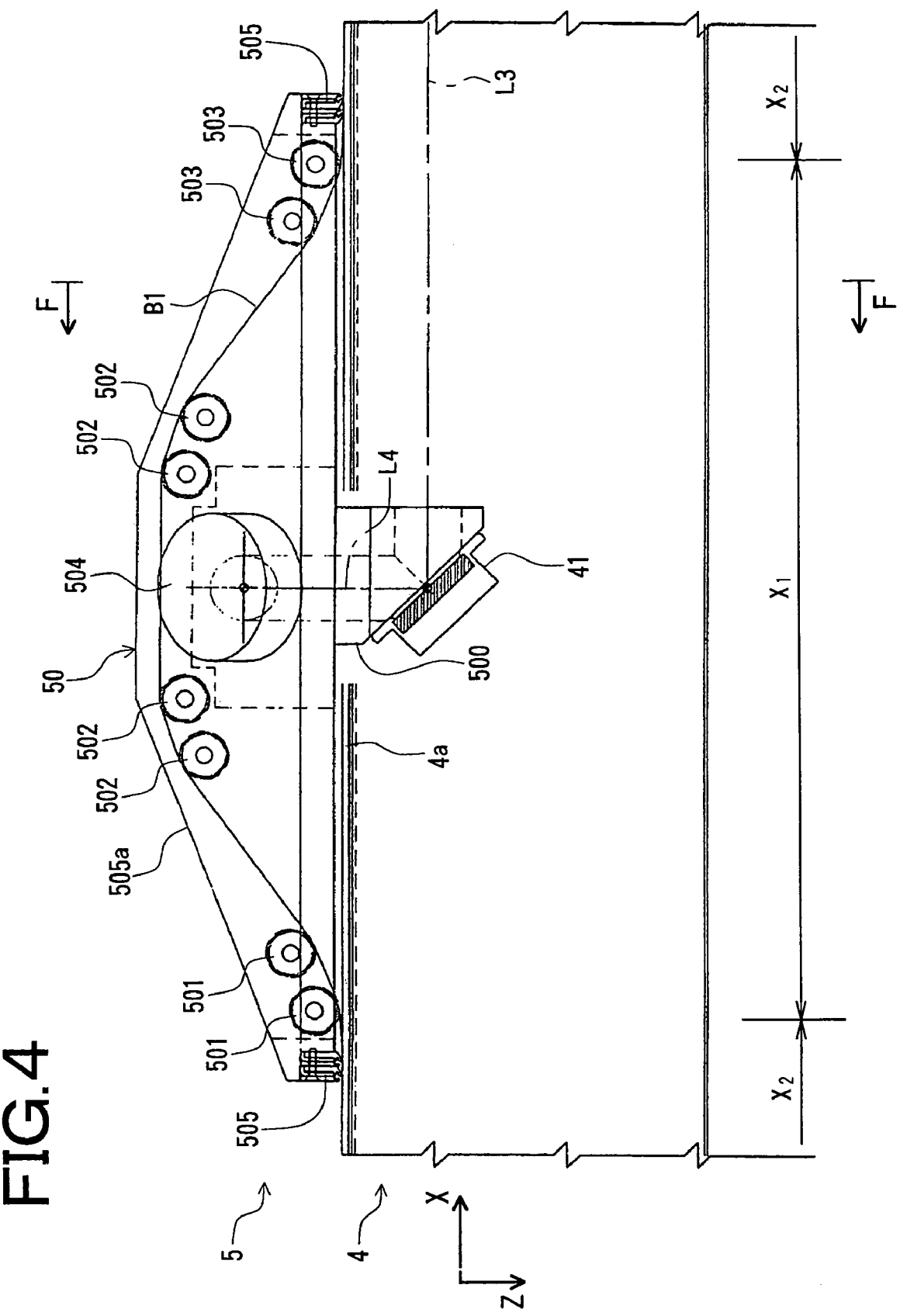
FIG. 4 is a sectional view of Line E-E of FIG. 3.
Figure 5:
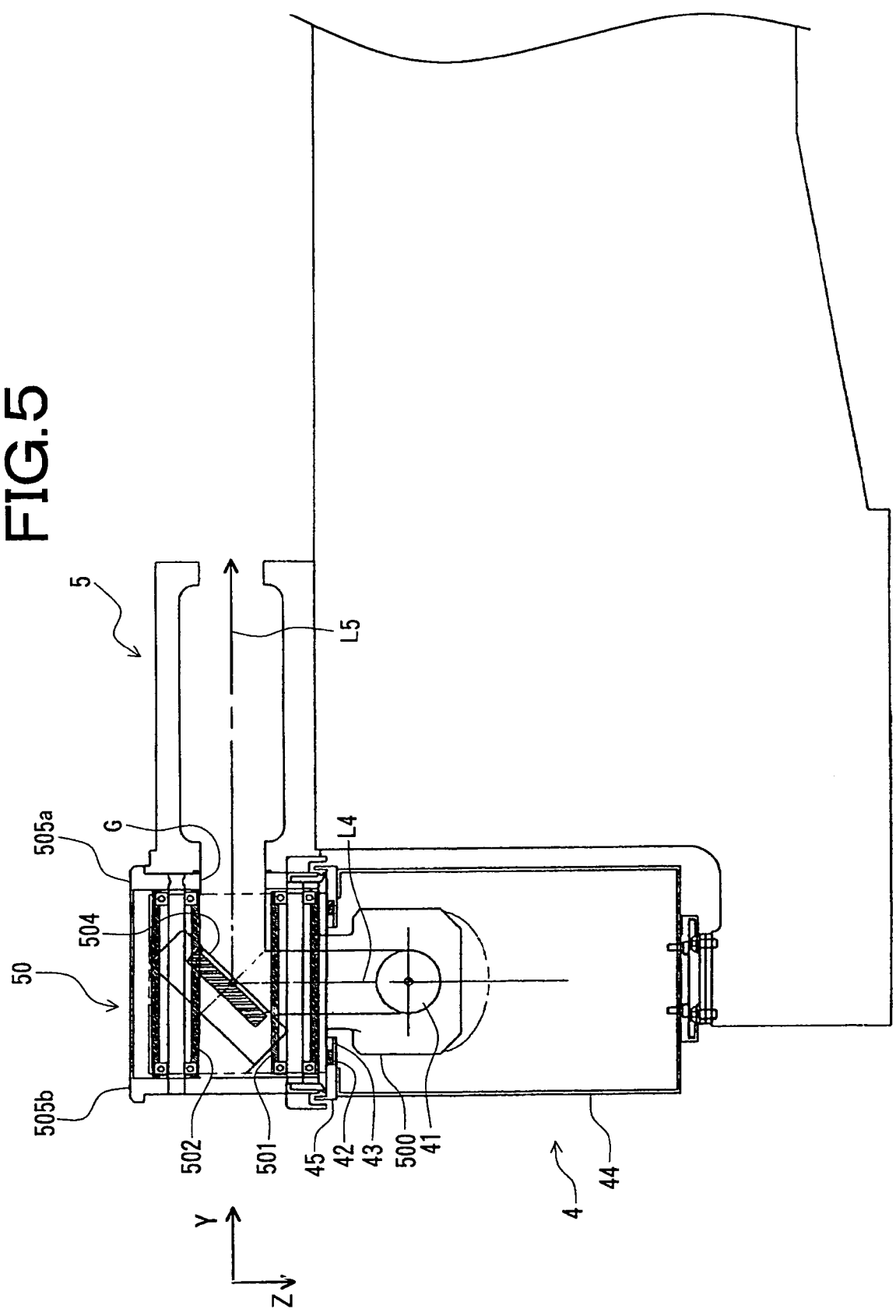
FIG. 5 is a sectional view of Line F-F of FIG. 4.
Figure 6:
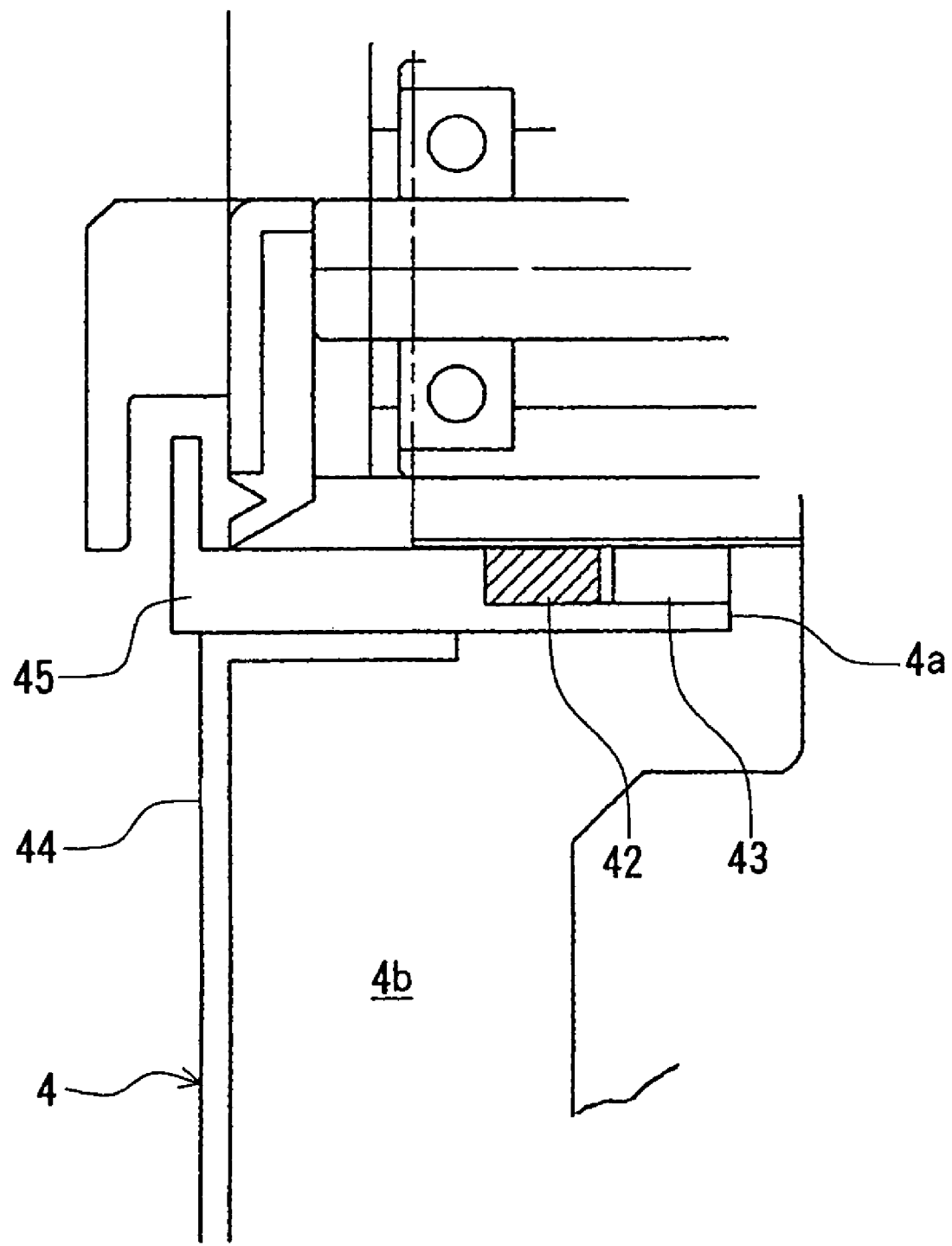
FIG. 6 is a sectional view showing details of a sealed portion of FIG. 5.
Figure 7:
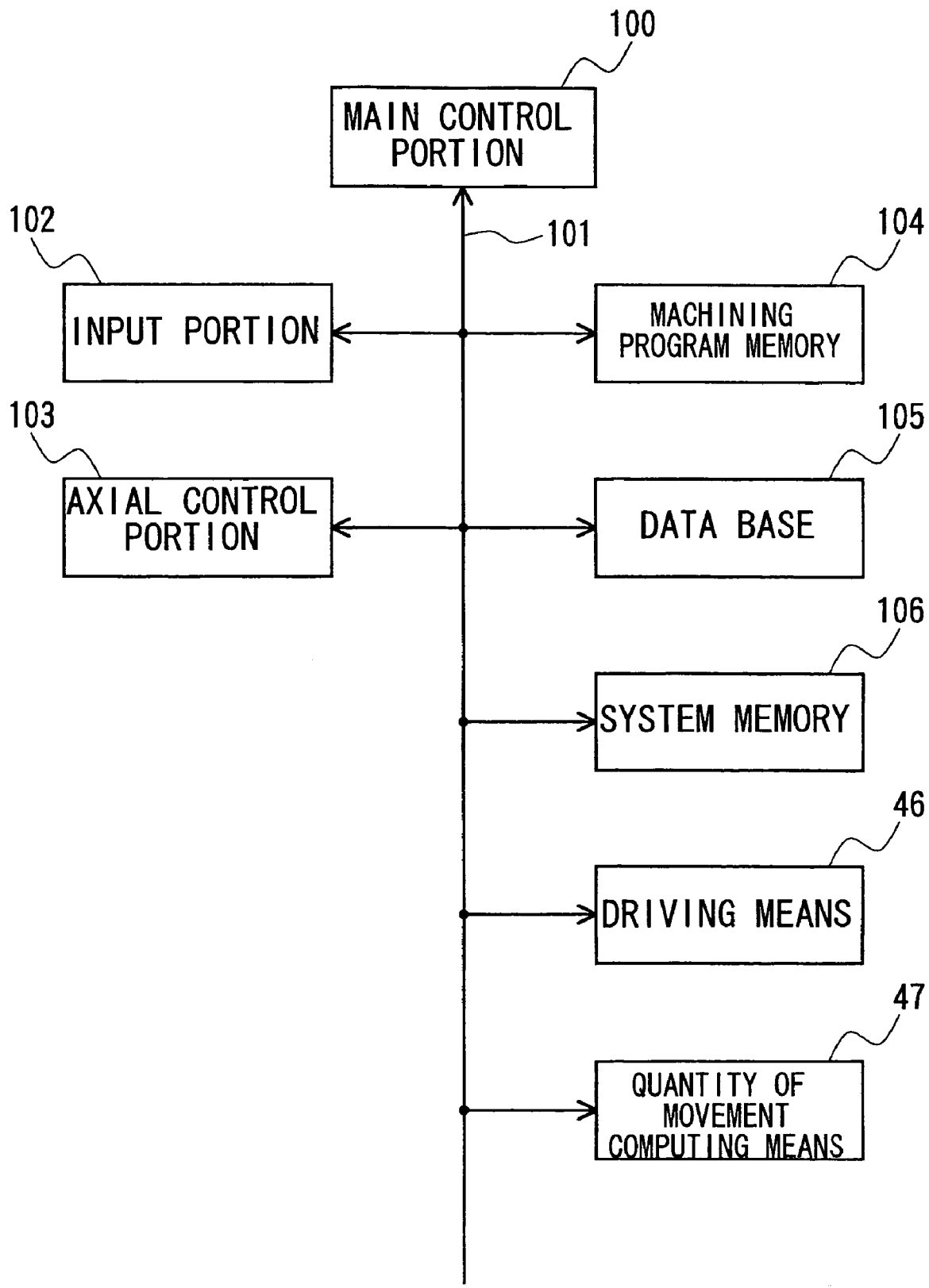
FIG. 7 is a control block diagram of the laser beam machine according to the invention.
Figure 8:
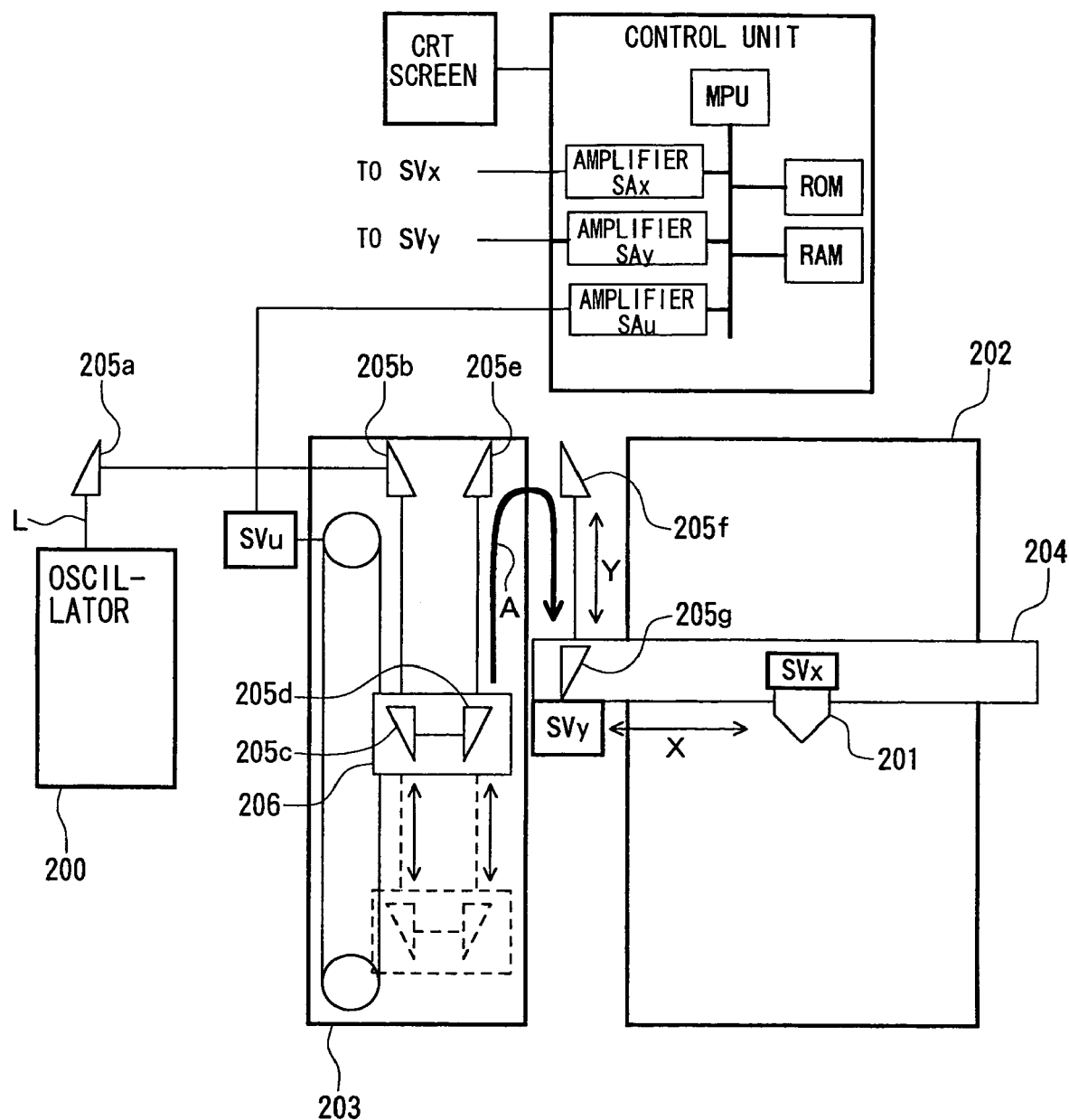
FIG. 8 is a typical view showing a structure of a conventional laser beam machine.

FIG. 1 is a typical view for explanation of a schematic structure of a laser beam machine according to the invention, FIG. 2 is a perspective view of an appearance of the whole structure of the laser beam machine according to the invention, FIG. 3 is a perspective view showing a detailed structure of a portion for catching laser beam between a first beam guide portion and a second beam guide portion, FIG. 4 is a sectional view of Line E-E of FIG. 3, FIG. 5 is a sectional view of Line F-F of FIG. 4, FIG. 6 is a sectional view showing details of FIG. 5, and FIG. 7 is a control block diagram of the laser beam machine according to the invention.

As shown in FIG. 1 and FIG. 2, a laser beam machine 1 according to the invention has a laser beam generating means 2 for generating laser beam L1, and a machining head 3 for radiating laser beam on a workpiece W, being moved and driven. Both the laser beam generating means 2 and the machining head 3 are communicated with each other through a first beam guide portion 4 and a second beam guide portion 5 which are optical paths of laser beam, and the machining head 3 radiates laser beam passed through the first and second beam guide portions 4, 5 on the workpiece W. The first beam guide portion 4 is an optical path for guiding the laser beam L1 from the laser beam generating means 2 in a first direction X, and the second beam guide portion 5 is an optical path for guiding the laser beam from the first beam guide portion 4 in a second direction Y. The machining head 3 is located, adjacent to the second beam guide portion 5. As shown in FIG. 1, a first reflecting means 40 for reflecting the laser beam L1 from the laser beam generating means 2 is movably located at the first beam guide portion 4, and the means 40 adjusts a length of the optical path of laser beam when reflected position of the laser beam being changed (details are explained hereinafter). And, a second reflecting means 41 is supported by the second beam guide portion 5 so as to face the first reflecting means 40, and the means 41 guides laser beam L3 reflected by the first reflecting means 40 to the second beam guide portion 5. According to the invention, the laser beam reflected by the first reflecting means 40 reaches the second reflecting means 41 through a shortest distance (without reflecting the laser beam by the other reflecting mirror) since the first and second reflecting means 40, 41 are disposed so as to face each other. The optical path of the laser beam after reflecting by the first reflecting means 40 until guiding in the second beam guide portion 5 can be made rather shorter, thereby making quality in machining with laser beam good.

Preferably, the second beam guide portion 5 is adjacent to the first beam guide portion 4 in at least a part thereof (see a reference number 50 of FIGS. 1 through 4), and is moved and driven in the first direction X, maintaining this adjacent state. Concretely speaking, rail members 7a, 7b are located along the first direction X, and the second beam guide portion 5 is movably supported by the rail means 7a, 7b, and is moved and driven with driving means 8a, 8b, as shown in FIG. 2.

It is necessary to catch laser beam by the second beam guide portion 5 even if the second beam guide portion 5 is at any position by moving and driving it. In order to do so, it is preferable to form a first opening portion 4a along the first direction X in the first beam guide portion 4 on a side adjacent to the second guide beam portion 5 (a portion concretely shown with a reference number 50 as shown in FIG. 3). The opening portion 4*a* is formed on the upper side of the first beam guide portion 4, but may be on the other side of it). In this case, it is preferable to support the second reflecting means 41 by the second beam guide portion 5 side (especially, the portion 50 adjacent to the first beam guide portion 4), not by the first beam guide portion 4 side so as to be moved and driven together with the second beam guide portion 5. Preferably, a bracket 500 is attached to the second beam guide portion 5, passing through the first opening portion 4*a* and projecting inside the first beam guide portion 4, and the second reflecting means 41 is attached to the bracket 500, detailedly shown in FIG. 4. In case where the second reflecting means 41 is not supported by the second beam guide portion 5 side, means for moving and driving the second reflecting means 41 is necessary in addition to means for driving and moving the second beam guide portion 5 and then, the structure is made complex. But, such means is unnecessary in a case where the second reflecting means 41 is moved and driven together with the second beam guide portion 5 (that is, the second reflecting means 41 can be also moved and driven by the means for moving and driving the second beam guide portion 5), thereby simplifying the structure. In a case where the second reflecting means 41 is moved and driven together with the second beam guide portion 5, the relative positional relation between both is always properly maintained, so that laser beam can be correctly guide from the second reflecting means 41 to the machining head 3.

Although it is necessary to open the first opening portion 4*a* in the portion for introducing laser beam into the second beam guide portion 5 (that is, a portion denoted with a reference number $X_1$ where the second reflecting means 41 is located) in order to catch laser beam, it is necessary to close the first opening portion 4*a* in the other portion (a portion dented with a reference number $X_2$ of FIG. 4) in order to prevent enter of dusts and foreign objects into the beam guide portion. Then, it is preferable to locate a first belt member B1 along the first opening portion 4*a* as shown in FIG. 4 so as to close the first opening portion 4*a* in the portion $X_2$ excluding the portion adjacent to the second beam guide portion 5 and so as not to close the first opening portion 4*a* in the portion $X_1$ adjacent to the second beam guide portion 5 in order to allow laser beam to be entered into the second beam guide portion 5. If the belt member B1 is thus used for closing the first opening portion 4*a*, it is sufficient to locate the first belt member B1 at a position spaced from the first opening portion 4*a* in order to partially open the first opening portion 4*a*. Then, the first belt member B1 is hard to be damaged if repeating opening and closing of the opening portion, thereby improving its durability in comparison with a case where bellows is used as a conventional way.

Preferably, a member for forming the first beam guide portion 4 has a U-shaped section as detailedly shown in FIG. 3 and FIG. 5, and the first opening portion 4*a* is located on the upper side. In order to certainly prevent enter of dusts and foreign objects into the beam guide portion, a first method or a second method, or both method are preferably used so as not to form a space between the belt member B1 and the first beam guide portion 4. That is, the first method is that a sealing member 42 closely contacting the first belt member B1 is located along both end portions of the opening portion 4*a*, as shown in FIG. 6 (in the figure, the sealing member is located along one side of both end portions), and the second method is that a magnet is located along both end portions of the first opening portion 4*a*, and a steel band belt is used for the first belt member B1 (only the magnet is shown along one side of both end portions in the figure). Preferably, the sealing member 42 is made of urethane. In FIG. 6, the sealing member 42 and the magnet 43 are not formed at a member comprising a beam guide space 4*b* (a member denoted with a reference number 44), but at a plate member 45, but may be at the member 44 itself.

As mentioned before, the belt member B1 is located in the portion adjacent to the second beam guide portion 5 (the portion $X_1$ of FIG. 4) so as not to close the first opening portion 4*a*, so that laser beam L4 is allowed to be entered into the second beam guide portion 5. In order to do so, a first movement unit 50 for catching laser beam by partially releasing closing of the first opening portion 4*a* with the first belt member B1 is preferably provided on the side of the second beam guide portion 5. A structure of this first movement unit 50 is now explained, referring to FIGS. 3 through 5.

Preferably, the first movement unit 50 moves, contacting with the first beam guide portion 4 or having a small space between both. In FIG. 3, the first movement unit 50 is located at an end portion of the second guide beam portion 5, but may be located at the other position excluding the end portion. Preferably, at least one rotatable roller 501 and at least one rotatable roller 503 are located at both end portions in the movement direction of the first movement unit 50 (that is, the end portions in the first direction X), adjacent to the first opening portion 4*a* (one roller 501 and one roller 503 are shown in FIG. 3 and two rollers 501 and two rollers 503 are shown in FIG. 4). And, preferably, at least one rotatable roller 502 (two in FIG. 3 and four in FIG. 4) are located at the positions spaced from the first opening portion 4*a* in a central portion in the movement direction. Preferably, a reflecting mirror 504 is located in the lower hand (the hand adjacent to the first opening portion 4*a*) of the rollers 502 in the central portion so as to reflect the laser beam L4 from the first beam guide portion 4 in the second direction Y. And, preferably, the first belt member B passes through the lower portion of the rollers 501, 503 of the both end portions in the movement direction and passes through the upper portion of the rollers 502. With such a structure, the first belt member B1 does not obstruct the optical path of the laser beam L4 even if the first movement unit 50 is moved to at any position in the first direction X, thereby catching the laser beam L4 from the first beam guide portion 4 into the second beam guide portion 5. Besides, the first belt member B1 closely contacts with the first beam guide portion 4 by the rollers 501, 503 in the portion $X_2$ excluding the portion where the first movement unit 50 is located, so that enter of dusts and foreign objects into the beam guide portion can be certainly prevented. In the portion $X_1$ where the first belt member B1 is located spaced from the first beam guide portion 4, wall portions 505*a*, 505*b* for rotatably supporting the rollers 501, 502, 503 stand as shown in FIG. 3, so that the wall portions close the first opening portion 4*a* together with the first belt member B1, and then, enter of dusts and foreign objects into the beam guide portion can be certainly prevented. But, enter of laser beam L5 into the second beam guide portion 5 is not obstructed since a hole G is formed at the wall portion 505*a*, as shown in FIG. 5. Preferably, a spatulate member 506 made of a flexible member is located at an outside rather than the rollers 501, 503 of the end portions in the movement direction, as shown in FIG. 4 in order to remove dusts and foreign objects on the surface of the belt member B1.

Preferably, the machining head 3 is moved and driven in the second direction Y, being adjacent to the second beam guide portion 5. In such a case, it is sufficient that the machining head 3 and the second beam guide portion 5 are adjacent to each other. The machining head 3 may be supported by the second beam guide portion 5 or by the other member excluding the second beam guide portion 5. Besides, the machining head 3 is preferably supported by the second beam guide portion 5 (or the other supporting member) through a saddle 6 of FIG. 2. When the machining head 3 being moved and driven, it is necessary to catch laser beam from the second beam guide portion 5 into the machining head 3 in any moved position. In order to do so, preferably, a second opening portion 5a, a second belt member B2 and a second movement unit 60 are provided, similar to the case of the first beam guide portion 4. The opening portion, the belt member and the like have structures similar to the above-mentioned, so that the explanation below mentioned is easy.

Preferably, the second opening portion 5a is formed in the second beam guide portion 5 along the second direction Y, as shown in FIG. 3. As shown in FIGS. 1 and 3, it is necessary to locate a third reflecting means 51 at a position facing the reflecting mirror 504 (that is, the mirror for reflecting the laser beam L4 from the first beam guide portion 4 in the second direction Y as shown with the reference number L5) so as to take the laser beam L5 out of the second beam guide portion 5 in the machining head 3. Preferably, the third reflecting means 51 is supported by the side of the machining head 3 or the saddle 6 so as to be moved and driven together with the machining head 3 or the saddle 6. If the third reflecting means 51 is not supported by the side of the machining head 3 or the saddle 6, means for driving and moving the third reflecting means 51 is necessary in addition to the means for moving and driving the machining head 3 and the like in the second direction Y, so that the structure is made complex. But, such means is unnecessary if the third reflecting means 51 is supported by the side of the machining head 3 (that is, the third reflecting means 51 can be also moved and driven by the means for moving and driving the machining head 3 and the like in the second direction Y), thereby simplifying the structure. If the third reflecting means 51 is supported by the side of the machining head 3, the relative positional relation between both is always properly maintained, thereby correctly guiding laser beam from the third reflecting means 51 in the machining head 3.

Preferably, the second belt member B2 is located along the second opening portion 5a so as not close the second opening portion 5a in a portion Y1 through which laser beam is taken out in the side of the machining head (that is, the portion adjacent to the machining head) in order to allow enter of the laser beam, and so as to close the second opening portion 5a in the other portion (that is, a portion Y2 excluding the portion adjacent to the machining head) If the belt member B2 is used for closing the second opening portion 5a, it is sufficient to locate the second belt member B2 at a position spaced from the second opening portion 5a in order to partially open the second opening portion 5a. Then, the second belt member B2 is hard to be damaged even if repeating opening and closing of the opening portion, thereby improving its durability in comparison with the case where bellows is used as a conventional way.

Preferably, the member for forming the second beam guide portion 5 is one having a U-shaped section, as shown in FIG. 3, and the second opening portion 5a is located on the upper side. The sealing member 42 or the magnet 43 of FIG. 6 may be located along both ends of the opening portion 5a.

Furthermore, the second movement unit 60 may have a structure similar to the first movement unit 50. In FIG. 3, rollers 601, 602, 603 respectively correspond to the rollers 501, 502, 503. A reference number 604 denotes a reflecting mirror for guiding laser beam on the machining head side. And, reference numbers 605a, 605b respectively correspond to the wall portions 505a, 505b.

Preferably, a workpiece support portion 9 for supporting the workpiece W is located on the lower hand of the machining head 3 and the second beam guide portion 5, as shown in FIG. 2.

As shown in FIGS. 1 and 2, the first beam guide portion 4 extends from a portion near the laser beam generating means 2 in the first direction X.

As shown in FIG. 1, it is necessary that the first reflecting means 40 is a retroreflector for reflecting the laser beam L1 from the laser beam generating means 2 "in a direction the laser beam L1 has been emitted" in return (see reference number L3). The first reflecting means 40 as shown in FIG. 1 is comprised of a mirror 401 inclined at an angle of 45° with respect to the incident beam L1 and a mirror 402 inclined with an angle of 45° with respect to a reflected beam L2, but the first reflecting means 40 may have the other structure. The mirrors 401, 402 may be inclined at the other angle (such as 30° and 60°) as long as an optical axis of the laser beam L3 and the first direction X are parallel to each other. Besides, the reflecting means 40 may be comprised of three or more mirrors. In FIG. 1, the mirrors 401, 402 are adjacent to each other in the direction Y which is the second direction, but may be adjacent to each other in a direction excluding the second direction, almost perpendicular to the direction where laser beam is injected (that is, the direction +X).

It is necessary that the first reflecting means 40 is movable, and the movement may be along the first direction X. For this movement, the mirrors 401, 402 of the first reflecting means 40 are preferably supported by a support member 403 so as to freely move the support member 403 in the first direction X. The farther these mirrors are from the second beam guide portion 5 (see reference numbers 401' and 402'), the longer the optical path of laser beam is in the first beam guide portion 4. On the contrary, the closer these mirrors 401, 402 are to the second guide portion 5, the shorter the optical path of laser beam (the length of the optical path in the first beam guide portion 4) is. The first reflecting means 40 may be moved and driven by driving means 46. Preferably, quantity of movement computing means 47 for computing quantity of movement of the first reflecting means 40 so as to make the length of the optical path of laser beam (the whole length of the optical path from the laser beam generating means 2 until the machining head 3) almost constant when moving the machining head 3 is provided, the driving means 46 moves and drives the first reflecting means 40 on the basis of a computed result so as to make the length of the optical path of laser beam from the laser beam generating means 2 until the machining head 3 almost constant. According to the invention, the optical path of laser beam from the laser beam generating means 2 until the machining head 3 can be maintained to be almost constant in spite of a moved position of the machining head 3, thereby maintaining quality of machining to be constant.

When locating the first reflecting means 40 for adjusting the length of the optical path at the second beam guide portion 5, not at the first beam guide portion 4, the means 46 for driving the first reflecting means 40 is also necessary to be located at the beam guide portion 5. Then, the solid second beam guide portion 5 is necessary to support these portions, so that increase of weight of the second beam guide portion 5 becomes an obstacle in moving and driving the second beam guide portion 5. Due to the increase of the weight of the second beam guide portion 5, the following problems may occur: a high output of the driving means for driving the second beam guide portion 5 should be used, a position of the machining head 3 is slightly shifted due to a big inertia force acting at the time of moving and stopping the second beam guide portion 5, so that machining efficiency decreases, and the long-shaped second beam guide portion 5 may deform by its own weight with high possibility since the second beam guide portion 5 has an almost arch shape, bridging over the workpiece support portion 9 for supporting the workpiece W (and a table T) in the laser beam machine as shown in the figure, so that the position of the machining head 3 is shifted and machining efficiency decreases when deforming the second beam guide portion 5 by its own weight. On the contrary, if the first reflecting means 40 is located at the first beam guide portion 4 (the first beam guide portion 4 provided at the side of the table T), as the invention, the second beam guide portion 5 can be made smaller and lighter, and the second beam guide portion 5 can be smoothly moved and driven.

Subsequently, a method of adjusting the length of the optical path is now explained.

When moving the second beam guide portion 5 by $\Delta X$ in the first direction X with respect to a standard position and moving the machining head 3 by $\Delta Y$ in the second direction Y with respect to a standard position, the length of the optical path from the laser beam generating means 2 to the machining head 3 increases by a length ($\Delta X + \Delta Y$) if the first reflecting means 40 is not moved and driven. When moving the first reflecting means 40 in a direction approaching the second beam guide portion 5 (that is, $-X$ direction) by a length ($\Delta X + \Delta Y$)/2, the lengths of the optical paths of the laser beam L1 and L3 respectively decrease by the length ($\Delta X + \Delta Y$)/2, and the whole length of the optical path (that is, the length of the optical path from the laser beam generating means 2 to the machining head 3) is maintained to be almost constant.

The laser beam machine 1 according to the invention has a main control portion 100, as shown in FIG. 7. And, a input portion 102, an axial control portion 103, a machining program memory 104, a data base 105 and a system memory 106 are connected with the main control portion 100 via a bus line 101.

The input portion 103 is for inputting shape information of the workpiece W, and positional information of the machining head 3 through a keyboard, and the machining program memory 104 stores composed machining program. And, the axial control portion 103 moves and drives the machining head 3 by controlling the driving means 8a, 8b.

The present invention has been explained on the basis of the example embodiments discussed. Although some variations have been mentioned, the embodiments which are described in the specification are illustrative and not limiting. The scope of the invention is designated by the accompanying claims and is not restricted by the descriptions of the specific embodiments. Accordingly, all the transformations and changes within the scope of the claims are to be construed as included in the scope of the present invention.

The invention claimed is:

1. Laser beam machine having laser beam generating means for generating laser beam, a first beam guide portion for guiding said laser beam from said laser beam generating means in a first direction, a second beam guide portion for guiding said laser beam from said first beam guide portion in a second direction, and a machining head for radiating said laser beam passed through said first beam guide portion and said second beam guide portion, being moved and driven, on a workpiece, said machining head located adjacent to said second beam guide portion, comprising:

a movable first reflecting means located at said first beam guide portion, for adjusting a length of an optical path of said laser beam according to a change of a reflected position of said laser beam;

a second reflecting means supported by said second beam guide portion so as to face said first reflecting means, for introducing said laser beam reflected by said first reflecting means into said second beam guide portion;

a first opening portion being formed at said first beam guide portion on a side adjacent to said second beam guide portion along said first direction;

a first belt member for preventing the entrance of dust and foreign objects into said first beam guide portion and being located along said first opening portion; and said first belt member being located so as to close said first opening portion in a portion excluding a portion adjacent to said second beam guide portion and so as not to close said first opening portion in said portion adjacent to said second beam guide portion in order to allow said laser beam to be entered into said second beam guide portion.

2. The laser beam machine according to claim 1, wherein said second beam guide portion is moved and driven in said first direction in such a state that at least a part thereof is adjacent to said first beam guide portion, and said second reflecting means is supported by a portion adjacent to said first beam guide portion on said second beam guide portion side and is moved and driven together with said second beam guide portion.

3. The laser beam machine according to claim 1, wherein said machining head is moved and driven in said second direction, adjacent to said second beam guide portion, and a third reflecting means which moves together with said machining head for introducing said laser beam from said second beam guide portion into said machining head.

4. The laser beam machine according to claim 3, wherein a second opening portion is formed at said second beam guide portion along said second direction, a second belt member for preventing entrance of dusts and foreign objects into said second beam guide portion is located along said second opening portion, and said second belt member is located so as to close said second opening portion in a portion excluding a portion adjacent to said machining head and so as not to close said second opening portion in said portion adjacent to said machining head in order to allow said laser beam to be entered into said machining head.

5. Laser beam machine having a laser beam generating unit for generating a laser beam, a first beam guide portion for guiding said laser beam from said laser beam generating unit in a first direction, a second beam guide portion for guiding said laser beam from said first beam guide portion in a second direction, and a machining head for radiating said laser beam passed through said first beam guide portion and said second beam guide portion, being moved and driven, on a workpiece, said machining head located adjacent to said second beam guide portion, comprising:

a movable first reflecting unit located at said first beam guide portion, for adjusting a length of an optical path of said laser beam according to a change of a reflected position of said laser beam;

a second reflecting unit supported by said second beam guide portion so as to face said first reflecting unit, for introducing said laser beam reflected by said first reflecting unit into said second beam guide portion;

a first opening portion being formed at said first beam guide portion on a side adjacent to said second bean guide portion along said first direction;

a first belt member for preventing entrance of dust and foreign objects into said first beam guide portion being located along said first opening portion; and said first belt member being located so as to close said first opening portion in a portion excluding a portion adjacent to said second beam guide portion and so as not to close said first opening portion in said portion adjacent to said second beam guide portion in order to allow said laser beam to be entered into said second beam guide portion.

6. The laser beam machine according to claim 5 wherein said second beam guide portion is moved and driven in said first direction in such a state that at least a part thereof is adjacent to said first beam guide portion, and said second reflecting unit is supported by a portion adjacent to said first beam guide portion on said second beam guide portion side and is moved and driven together with said second beam guide portion.

7. The laser beam machine according to claim 5, wherein said machining head is moved and driver in said second direction, adjacent to said second beam guide portion, and a third reflecting unit which moves together with said machining head introduces said laser beam from said second beam guide portion in said machining head.

8. The laser beam machine according to claim 7, wherein a second opening portion is formed at said second beam guide portion along said second direction, a second belt member for preventing entrance of dusts and foreign objects into said second beam guide portion is located along said second opening portion, and said second belt member is located so as to close said second opening portion in a portion excluding a portion adjacent to said machining head and so as not to close said second opening portion in said portion adjacent to said machining head in order to allow said laser beam to be entered into said machining head.

* * * * *